United States Patent
Waldrop, III et al.

(10) Patent No.: US 10,569,495 B2
(45) Date of Patent: Feb. 25, 2020

(54) COMPOSITE STRUCTURE ASSEMBLY HAVING A CONFORMABLE CORE

(71) Applicant: THE BOEING COMPANY, Chicago, IL (US)

(72) Inventors: John C. Waldrop, III, Saint Peters, MO (US); Zachary Benjamin Renwick, St. Louis, MO (US); Matthew Scott Thompson, O'Fallon, MO (US); Michael William Hayes, Belleville, IL (US)

(73) Assignee: The Boeing Company, Chicago, IL (US)

( * ) Notice: Subject to any disclaimer, the term of this patent is extended or adjusted under 35 U.S.C. 154(b) by 162 days.

(21) Appl. No.: 15/588,791

(22) Filed: May 8, 2017

(65) Prior Publication Data
US 2018/0319121 A1    Nov. 8, 2018

(51) Int. Cl.
*B32B 3/12*      (2006.01)
*B32B 3/26*      (2006.01)
(Continued)

(52) U.S. Cl.
CPC .............. *B32B 3/12* (2013.01); *B29D 24/005* (2013.01); *B32B 3/14* (2013.01); *B32B 3/16* (2013.01);
(Continued)

(58) Field of Classification Search
CPC .. B32B 3/12; B32B 3/266; B32B 3/14; B32B 3/16; B32B 2305/024; B32B 2605/18; B32B 5/022; B32B 5/024; B32B 27/12; B32B 27/20; B32B 27/281; B32B 27/285; B32B 27/286; B32B 27/34; B32B 2260/02; B32B 2260/04; B32B 2262/0269; B32B 2262/101; B32B 2262/106; B32B 2264/105; B32B 2307/102; B32B 2307/3065; B32B 2307/546; B64D 33/02; B64D 2033/0206; B29D 24/005
See application file for complete search history.

(56) References Cited

U.S. PATENT DOCUMENTS 3,466,220 A * 9/1969 Forbes ...................... B32B 3/12
428/118
3,533,894 A * 10/1970 Emerson .................. B31D 3/02
264/152

(Continued)

FOREIGN PATENT DOCUMENTS

WO    WO 2016/209155    12/2016

OTHER PUBLICATIONS

U.S. Appl. No. 15/212,454.
(Continued)

*Primary Examiner* — Patricia L. Nordmeyer
(74) *Attorney, Agent, or Firm* — Joseph M. Butscher; The Small Patent Law Group, LLC

(57) ABSTRACT

A composite structure assembly includes a composite core including a flexible base and a plurality of cells extending from the flexible base. The composite core is conformable to different shapes. The plurality of cells are configured to move in response to movement of the flexible base. At least one of the plurality of cells may include a central column connected to a first flared end and a second flared end that is opposite from the first flared end.

21 Claims, 9 Drawing Sheets

(51) Int. Cl.
  *B64D 33/02* (2006.01)
  *B32B 3/14* (2006.01)
  *B32B 5/02* (2006.01)
  *B29D 24/00* (2006.01)
  *B32B 27/34* (2006.01)
  *B32B 27/28* (2006.01)
  *B32B 27/20* (2006.01)
  *B32B 3/16* (2006.01)
  *B32B 27/12* (2006.01)

(52) U.S. Cl.
  CPC ............ *B32B 3/266* (2013.01); *B32B 5/022* (2013.01); *B32B 5/024* (2013.01); *B32B 27/12* (2013.01); *B32B 27/20* (2013.01); *B32B 27/281* (2013.01); *B32B 27/285* (2013.01); *B32B 27/286* (2013.01); *B32B 27/34* (2013.01); *B64D 33/02* (2013.01); *B32B 2260/02* (2013.01); *B32B 2260/046* (2013.01); *B32B 2262/0269* (2013.01); *B32B 2262/101* (2013.01); *B32B 2262/106* (2013.01); *B32B 2264/105* (2013.01); *B32B 2305/024* (2013.01); *B32B 2307/102* (2013.01); *B32B 2307/3065* (2013.01); *B32B 2307/546* (2013.01); *B32B 2605/18* (2013.01); *B64D 2033/0206* (2013.01)

(56) References Cited

U.S. PATENT DOCUMENTS

| | | |
|---|---|---|
| 4,384,020 A | 5/1983 | Beggs |
| 2002/0139899 A1 | 10/2002 | Porte |
| 2008/0113143 A1* | 5/2008 | Taylor ............... A63B 71/08 |
| | | 428/47 |
| 2009/0184200 A1 | 7/2009 | Lin |
| 2010/0307867 A1* | 12/2010 | Ogawa ................ B32B 3/18 |
| | | 181/288 |
| 2013/0059097 A1* | 3/2013 | Prud'homme ......... B32B 3/12 |
| | | 428/34.2 |
| 2014/0077031 A1 | 3/2014 | Benedetti |
| 2018/0274222 A1* | 9/2018 | Gadsden Lopez ...... E04C 2/365 |

OTHER PUBLICATIONS

U.S. Appl. No. 15/434,378.
Extended European Search Report for EP 18167268.4-1107, dated Aug. 10, 2018.

* cited by examiner

COMPOSITE STRUCTURE ASSEMBLY HAVING A CONFORMABLE CORE

FIELD OF EMBODIMENTS OF THE DISCLOSURE

Embodiments of the present disclosure generally relate to composite structure assemblies, and more particularly, to composite structure assemblies having cores that are configured to adapt and conform to various shapes.

BACKGROUND OF THE DISCLOSURE

Jet aircraft typically include one or more engines that may generate high levels of noise. For example, a fan case within a housing secured to a wing of an aircraft typically generates noise. Often, engine housings include one or more sound dampening structures that are used to absorb at least a portion of the noise generated by components of an engine. As an example, an acoustic inlet barrel may be positioned at or proximate to an inlet of the engine housing upstream from a fan case. Certain known acoustic inlet barrels are formed of composite materials, such as carbon-reinforced plastics, that are sandwiched around an acoustic core.

A composite structure may include panels that are fabricated with honeycomb or foam cores. A honeycomb core is structurally efficient, but may be expensive to produce. In particular, a honeycomb core may be formed through various processes that are labor and time intensive. In general, the core is cut, bonded, milled to contour, and formed. Typically, in order to form a core of a particular shape, a support structure is first formed. Portions that form the acoustic core are then layered over the support structure, which provides the particular shape to the core. After the core is formed, the support structure is typically discarded, as it forms no part of the actual core.

As can be appreciated, the process of first forming a support structure adds time and cost to the manufacturing process. Also, adding a septum to core cells increases costs and complexity of the composite structure. Further, using a support structure to form a core generates waste, as the support structure itself does not form part of the core.

SUMMARY OF THE DISCLOSURE

Certain embodiments of the present disclosure provide a composite structure assembly that includes a composite core including a flexible base and a plurality of cells extending from the flexible base. The composite core is conformable to different shapes. The plurality of cells are configured to move in response to movement of the flexible base.

The plurality of cells are separated from one another by a plurality of gaps. In at least one embodiment, each of the plurality of cells includes a first end that directly connects to a support surface of the flexible base, and a second end opposite the first end, in which the second end is free.

The composite structure assembly may also include one or both of a first skin coupled to the base, and a second skin coupled to the plurality of cells. At least one of the plurality of cells may include a honeycomb structure.

The flexible base may include a plurality of holes. In at least one embodiment, the flexible base includes a plurality of linear row beams connected to a plurality of linear column beams. A plurality of openings are formed between the plurality of linear row beams and the plurality of linear column beams. A plurality of diagonal beams may connect to the plurality of linear row beams and the plurality of linear column beams. In at least one embodiment, the flexible base includes a plurality of regular, repeating six pointed star patterns that define a plurality of openings.

In at least one embodiment, at least one of the plurality of cells includes a central column connected to a first flared end and a second flared end that is opposite from the first flared end. A first width (for example, a diameter of a circular cross-section) of the central column is less than each of a second width of the first flared end and a third width of the second flared end. Each of the first flared end and the second flared end may connect to the central column through a smooth transition.

At least two of the plurality of cells may differ in one or both of size and shape.

In at least one embodiment, the composite structure assembly is configured to interlock to another composite structure assembly via outer peripheral edges.

Certain embodiments of the present disclosure provide a method of forming a composite structure assembly. The method includes connecting a plurality of cells to a flexible base, forming a composite core including the plurality of cells extending from the flexible base by the connecting, and conforming the composite core to different shapes. The conforming includes moving the plurality of cells in response to movement of the flexible base.

Certain embodiments of the present disclosure provide a composite structure assembly that includes a composite core including a plurality of cells. At least one of the plurality of cells includes a central column connected to a first flared end and a second flared end that is opposite from the first flared end.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

The embodiments described herein provide an efficient system and method of forming a core of a composite structure. Further, the embodiments described herein provide a core of a composite structure that may conform to various shapes. Additionally, the herein-described embodiments provide a method of forming a core of a composite structure without the need for a support structure to shape the core. More specifically, embodiments of the present disclosure provide a composite structure assembly including a conformable core that is configured to adapt and conform to various shapes. The core is conformable to complex contours and may be formed without the need for additional forming, joining, and milling related operations. The core includes a plurality of core cells that may accommodate acoustic treatments, for example. The core cells are coupled to a flexible base, such as a living hinge, that allows the cells to flexibly move in relation to one another, in order to allow the core to conform to various shapes. In at least one embodiment, the cells include columns connected to flared ends, thereby reducing core density while maintaining surface support and shear resistance.

Embodiments of the present disclosure allow for the production of unique, custom cores that may be fabricated without secondary forming, splicing, and milling operations. The cores are conformable to complex contours and yet can be efficiently produced on fused filament fabrication additive manufacturing machines without the use of support materials.

Certain embodiments of the present disclosure provide a composite structure assembly including a core. The core includes a plurality of cells having free ends. Adjacent free ends define a gap therebetween. A flexible base couples the cells together. The flexible base fixes the cells in a prescribed, positional array.

Figure 1:
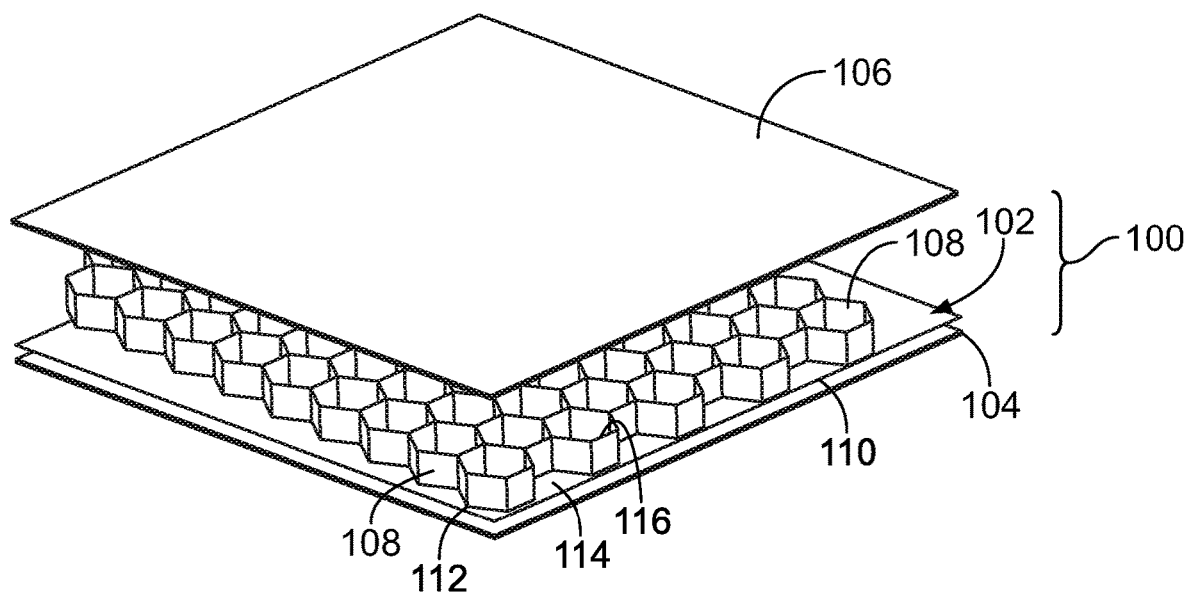
FIG. 1 illustrates a perspective exploded view of composite structure assembly, according to an embodiment of the present disclosure.

FIG. 1 illustrates a perspective exploded view of composite structure assembly 100, according to an embodiment of the present disclosure. The composite structure assembly 100 includes a composite core 102 (such as an acoustic core) that can include first and second skins 104 and 106 having the composite core 102 sandwiched therebetween. The core 102 includes a plurality of cells 108 coupled to a flexible base 110, such as a living hinge. As shown, the cells 108 outwardly extend from the base 110. The core 102, including the cells 108 and the base 110, may be formed of fiber-reinforced, particle-filled, or unfilled various types of thermoplastic polymers, and the like. As non-limiting examples, the core 102 may be formed of thermoplastics such as polyamide (PA), polyphenylene sulfide (PPS), polyether ether ketone (PEEK), polyether ketone ketone (PEKK), polyetherimide (PEI), polyphenylsulfone (PPSU), polyethersulfone (PES), thermoplastic polyimide (TPI), liquid crystalline polymer (LCP), polyamide-imide (PAI), or the like. The core 102 may be formed of thermoplastics containing carbon fibers, glass fibers, aramid fibers, mineral fillers, metallic fillers, nanomaterial fillers, thermal stabilizing additives, flame retardants, or the like. The core 102 may include more or less cells 108 than shown. Further, the core 102 may be shaped differently than shown.

The core 102 may be formed by depositing the base 110 on a flat surface. Next, the cells 108 are deposited onto the base 110. The cells 108 may then be melt fused to the base 110 to provide a unitary core structure.

The cells 108 have first ends 112 that directly connect to a support surface 114 of the base 110. Second ends 116 that are opposite from the first ends 112 are free. Gaps separate adjacent cells 108 from one another. In at least one embodiment, adjacent cells 108 are separated from one another from the first ends 112 to the second ends 116. The cells 108 are not directly connected to one another. Instead, the cells 108 are separated from one another, and connected to the base 110.

The base 110 is flexible and allows the cells 108 to flex towards and away from one another in response to movement of the base 110. For example, as the base is urged into an outwardly-curved shape (away from the skin 104) the second ends 116 of the cells 108 move away from one another, thereby expanding the gaps between adjacent cells 108. Conversely, when the base is urged into an inwardly-curved shape (towards the skin 104), the second ends 116 of the cells 108 merge towards one another, thereby reducing the sizes of the gaps between the adjacent cells 108. In this manner, the base 110 provides a flexible support structure that allows the core 102 to adapt and conform to various shapes.

The first and second skins 104 and 106 may include one or more pre-impregnated epoxy resin layers that include fibers, such as fiberglass, quartz, graphite, Kevlar, and/or the like. The first and second skins 104 and 106 may be identical to one another. In at least one other embodiment, the first and second skins 104 and 106 may include more or less layers than one another.

The core 102 and the skins 104 and 106 may be securely sandwiched together through one or more adhesives, fasteners, wraps, films, and/or the like. Optionally, the composite structure assembly 100 may include less than both of the skins 104 and 106. In at least one embodiment, the composite structure 100 may not include the skins 104 and 106.

The composite structure assembly 100 may include more components than shown. For example, the composite structure assembly 100 may include a cover (not shown), such as a laminate sheet. As another example, the composite structure assembly 100 may include one or more electronic components mounted thereon, or positioned therein.

Figure 2:
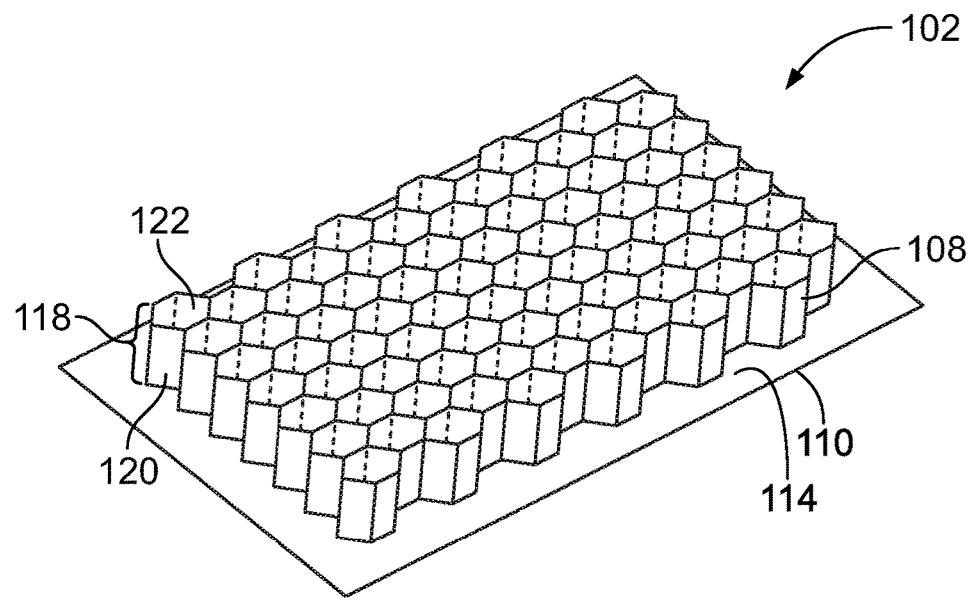
FIG. 2 illustrates a perspective top view of a core, according to an embodiment of the present disclosure.

FIG. 2 illustrates a perspective top view of the core, according to an embodiment of the present disclosure. As shown, the core 100 includes a honeycomb structure having a plurality of hexagonal cells 108 coupled to the flexible base 110. Alternatively, the cells 108 may be various other shapes, such as circles (for example, cylinders having circular cross sections), squares, triangles, pentagons, octagons, or the like. Adjacent cells 108 are separated from one another by gaps (shown in FIGS. 3 and 4, for example).

Each cell 108 includes a main body 118, such as a column, formed by outer walls 120. A central cavity 122 may be defined between the walls 120 of each main body 118. An acoustic dampener (not shown) may be disposed within the central cavity 122. Examples of acoustic dampeners include septums within cells 108, foam inserts, baffles, elastomeric materials, and the like.

Figure 3:
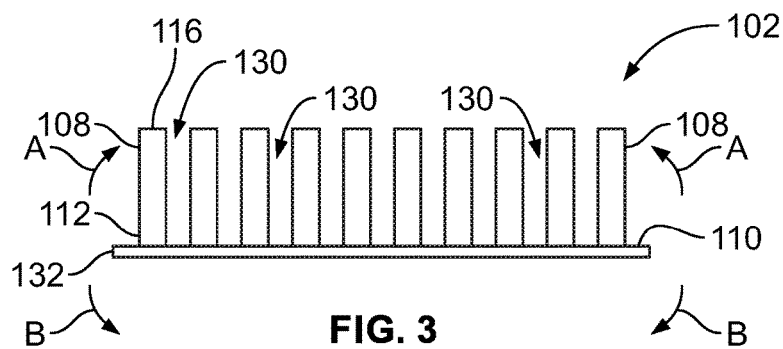
FIG. 3 illustrates a lateral view of a core, according to an embodiment of the present disclosure.

FIG. 3 illustrates a lateral view of the core 102, according to an embodiment of the present disclosure. The ends 112 of the cells 108 directly connect to the support surface 114 of the base 110. In contrast, the ends 116 of the cells 108 are free.

Gaps 130 are formed between adjacent cells 108. The gaps 130 extend between the ends 112 and 116 of adjacent cells 108. The gaps 130 allow the cells 108 to flex towards and away from one another in response to movement of the base 110. For example, as opposite ends 132 and 134 of the base 110 are folded towards one another in the direction of arrows A, the free ends 116 of the cells 108 merge towards one another, thereby decreasing the size of each gap 130. Conversely, when the ends 132 and 134 of the base 110 are folded towards one another in the direction of arrows B (which are opposite from arrows A), the free ends 116 of the cells 108 diverge from one another, thereby increasing the size of each gap 130. As such, the cells 108 may adapt and conform to various components due to the flexible base 110, which supports the cells 108.

When the base 110 is flat, as shown in FIG. 3, the gaps 130 may be uniform in size throughout the core 102. Optionally, at least some of the gaps 130 may be sized differently when the base 110 is flat.

Each of the cells 108 may be the same size and shape. Optionally, at least some of the cells 108 may differ in size and shape from other cells 108.

Figure 4:
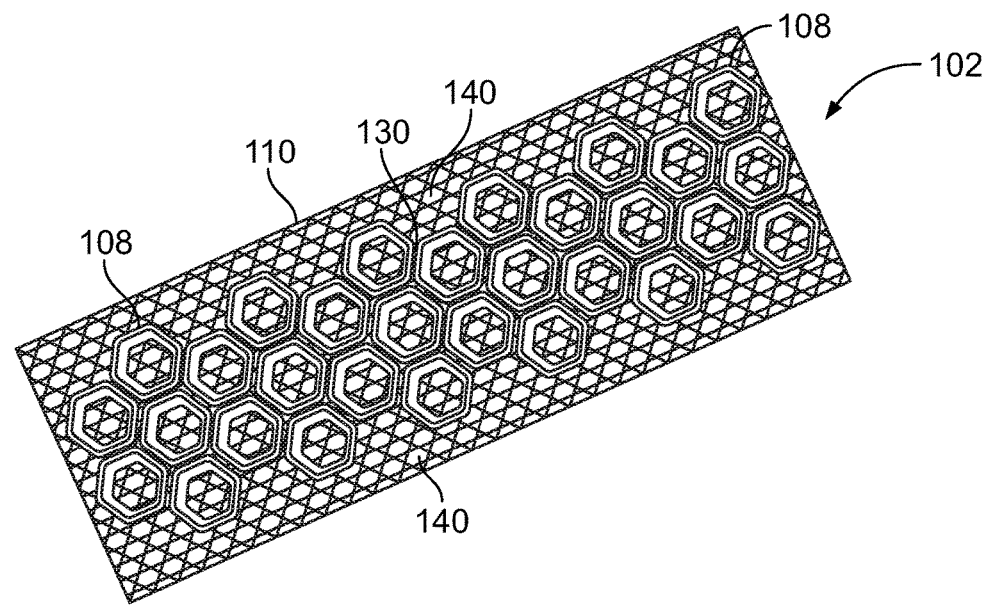
FIG. 4 illustrates a perspective top view of a core, according to an embodiment of the present disclosure.
Figure 5:
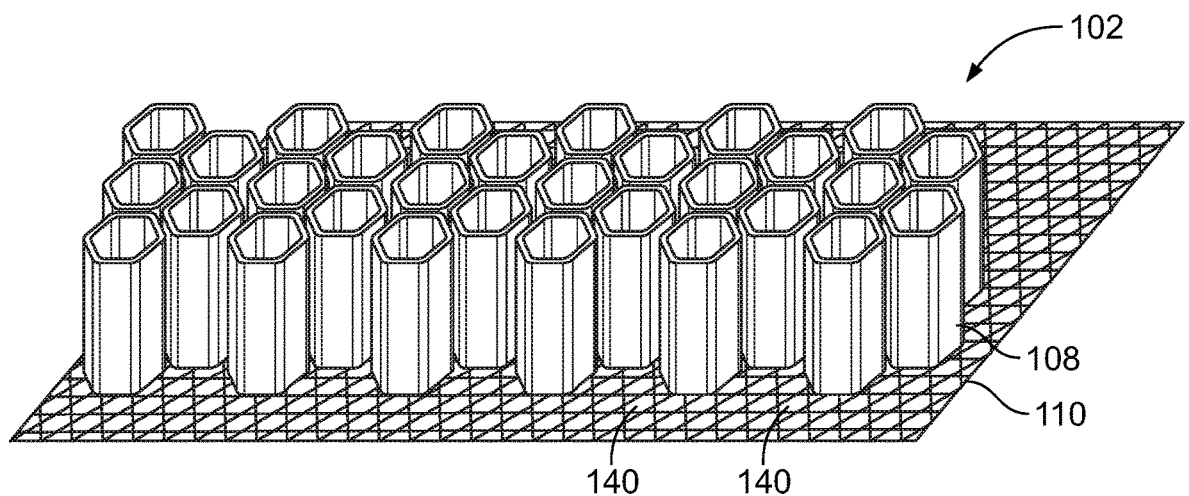
FIG. 5 illustrates a perspective lateral view of a core, according to an embodiment of the present disclosure.

FIG. 4 illustrates a perspective top view of the core 102, according to an embodiment of the present disclosure. FIG. 5 illustrates a perspective lateral view of the core 102. Referring to FIGS. 4 and 5, the base 102 may include a plurality of holes 140, which provide increased flexibility to the base 102. In at least one embodiment, the base 102 forms a mesh-like structure having a plurality of holes 140. The holes 140 may be smaller or larger than shown. Alternatively, the base 102 may not include any holes. Instead, the base 102 may be a contiguous structure. Forming the base 102 without holes provides a stiffer, less flexible structure.

Figure 6:
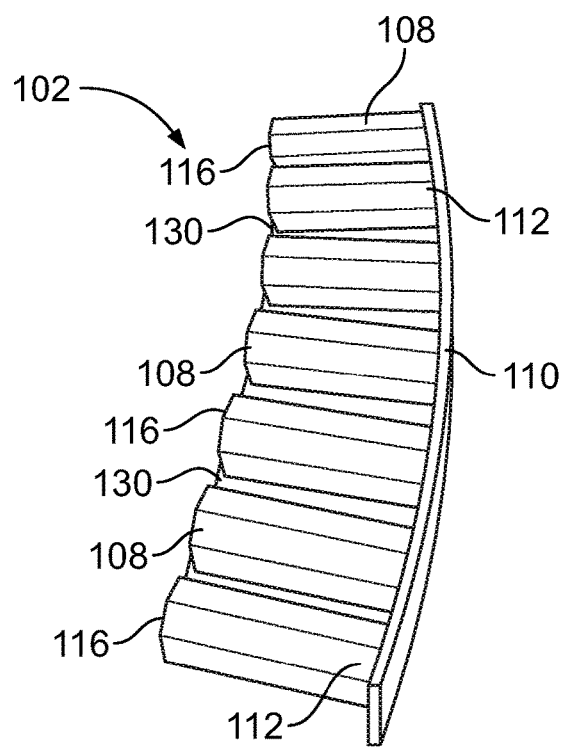
FIG. 6 illustrates a perspective lateral view of a core that is inwardly-curved, according to an embodiment of the present disclosure.

FIG. 6 illustrates a perspective lateral view of a core 102 that is inwardly-curved, according to an embodiment of the present disclosure. As shown, when the core 102 is inwardly folded, the free ends 116 of the cells 108 merge towards one another. Compared to a flat core, the gaps 130 of the inwardly-curved core 102 are reduced in size. In particular, the gaps 130 are reduced in size between ends 112 and 116.

Figure 7:
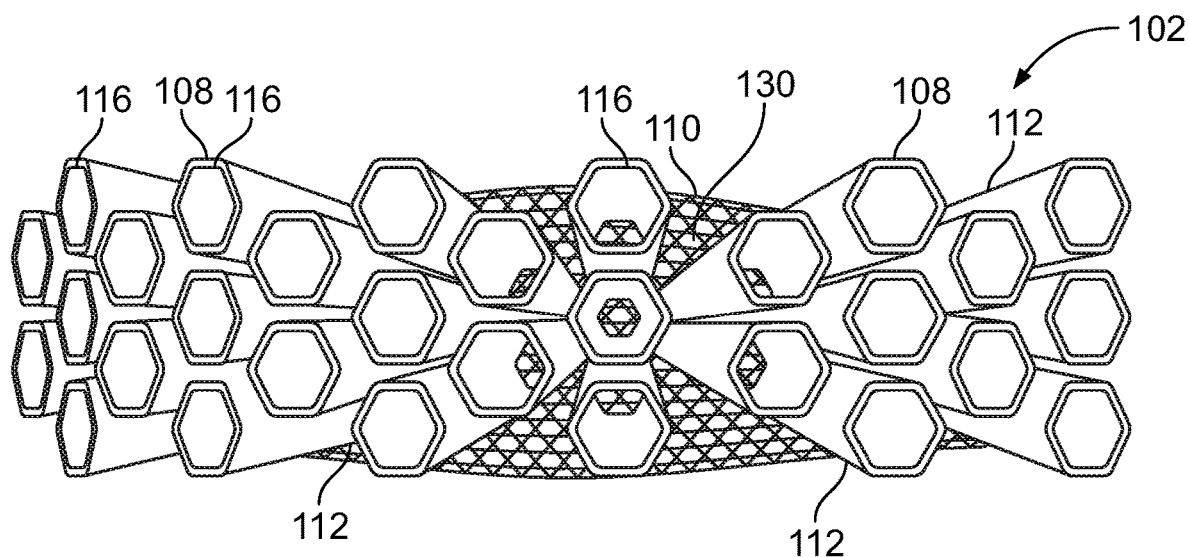
FIG. 7 illustrates a perspective top view of a core that is outwardly-curved, according to an embodiment of the present disclosure.

FIG. 7 illustrates a perspective top view of a core 102 that is outwardly-curved, according to an embodiment of the present disclosure. When the core 102 is outwardly folded, the free ends 116 of the cells 108 diverge away from one another. Compared to a flat core (or inwardly-curved core), the gaps 130 of the outwardly-curved core 102 are expanded (that is, increased in size). In particular, the gaps 130 increase in size between ends 112 and 116.

Figure 8:
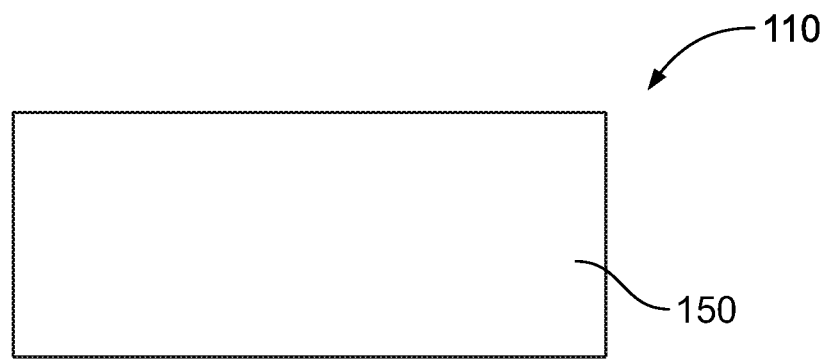
FIG. 8 illustrates a top view of a base, according to an embodiment of the present disclosure.

FIG. 8 illustrates a top view of a base 110, according to an embodiment of the present disclosure. In this embodiment, the base 110 includes a contiguous support sheet 150, as opposed to a mesh having holes therethrough. The base 110 may be sized and shaped differently than shown.

Figure 9:
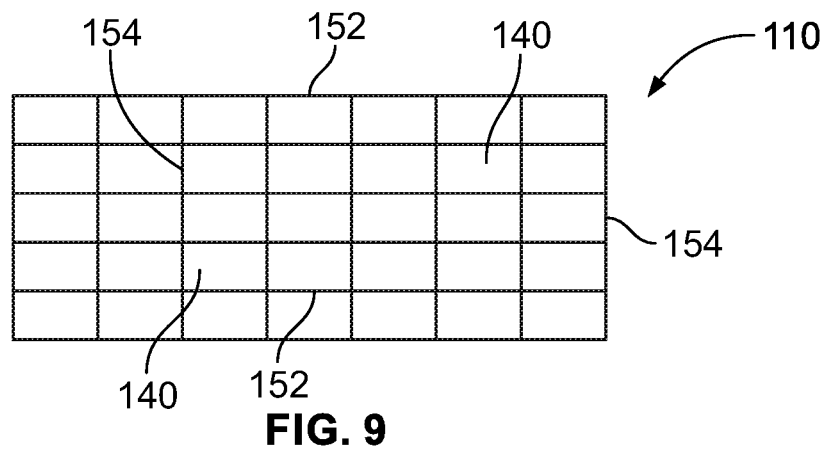
FIG. 9 illustrates a top view of a base, according to an embodiment of the present disclosure.

FIG. 9 illustrates a top view of a base 110, according to an embodiment of the present disclosure. In this embodiment, the base 110 includes a plurality of first linear row beams 152 connected to a plurality of linear column beams 154, providing the plurality of openings 140 therebetween. As such, the base 110 may be formed as a lattice structure. The openings 140 provide increased flexibility to the base 110. The base 110 may include more or less row beams 152 and column beams 154 than shown. Further, the row beams 152 and the column beams 154 may be thicker or thinner than shown. The base 110 may be sized and shaped differently than shown.

Figure 10:
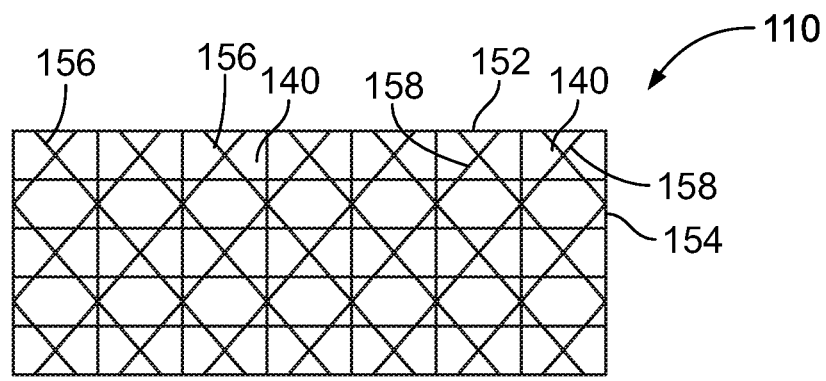
FIG. 10 illustrates a top view of a base, according to an embodiment of the present disclosure.

FIG. 10 illustrates a top view of a base 110, according to an embodiment of the present disclosure. The embodiment shown in FIG. 10 is similar to the embodiment shown in FIG. 9, except that the base 110 shown in FIG. 10 includes a plurality of diagonal beams 156 oriented at a first angle, and a plurality of diagonal beams 158 oriented at a second angle that differs from the first angle. The diagonal beams 156 and 158 provide increased support structure and rigidity to the base 110. Optionally, the base 110 may include more or less diagonal beams than shown. Further the diagonal beams 156 and 158 may be thicker or thinner than shown. The base 110 may be sized and shaped differently than shown.

Figure 11:
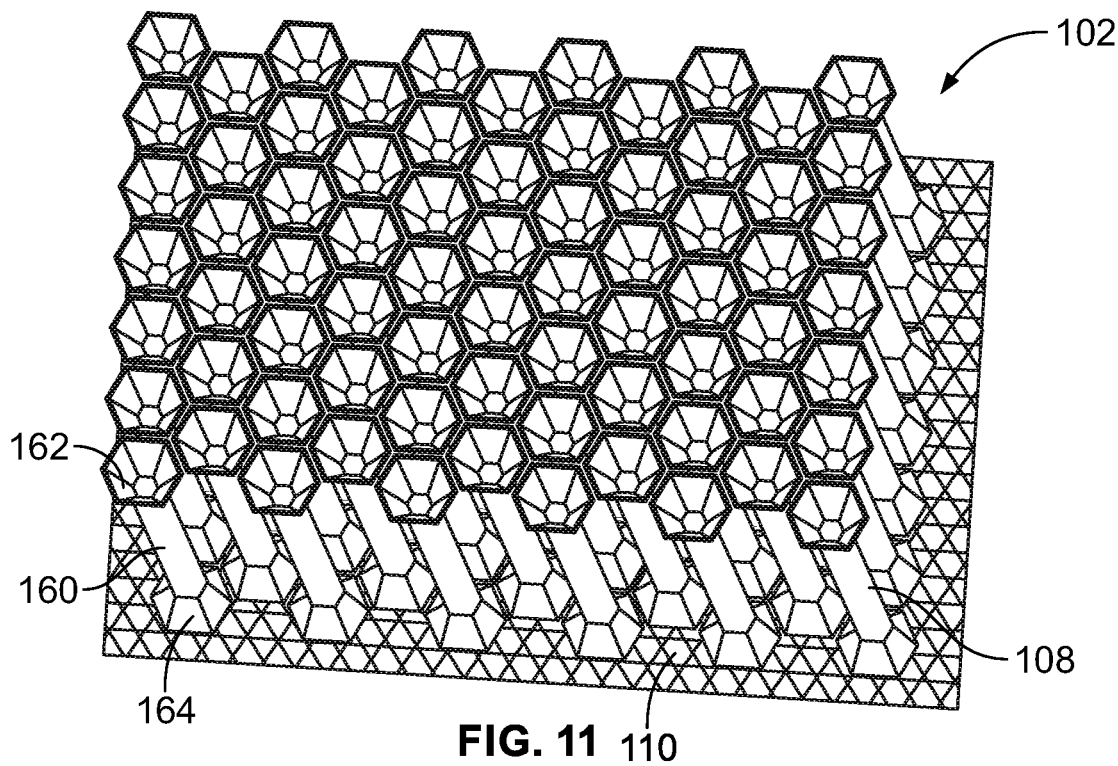
FIG. 11 illustrates a perspective top view of a core, according to an embodiment of the present disclosure.
Figure 12:
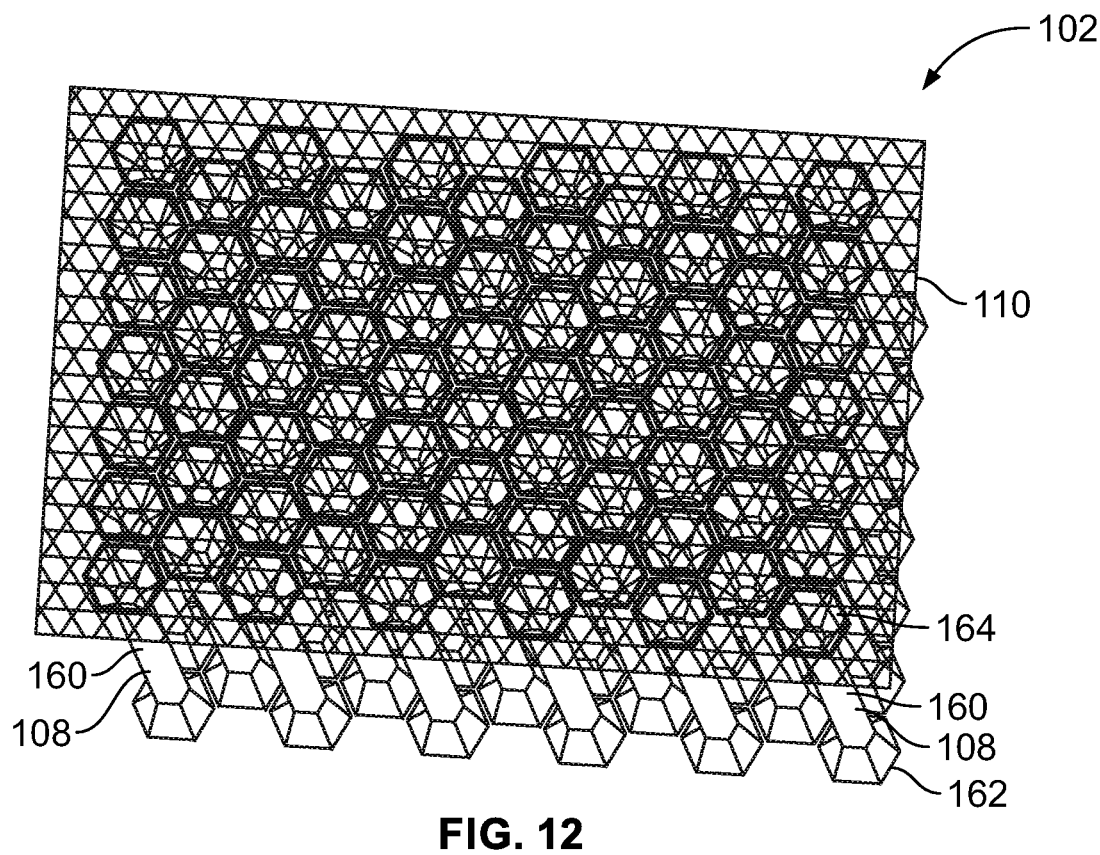
FIG. 12 illustrates a perspective bottom view of a core, according to an embodiment of the present disclosure.

FIG. 11 illustrates a perspective top view of a core 102, according to an embodiment of the present disclosure. FIG. 12 illustrates a perspective bottom view of a core 102. The cells 108 may include a central column 160 between flared ends 162 and 164. The flared ends 162 are free ends, while the flared ends 164 directly connect to the base 110.

The central column 108 may be a linear beam (such as a circular cylinder, square beam, triangular beam, hexagonal beam, or the like) having a width or diameter that is less than that of the flared ends 162 and 164. By reducing the width or diameter of the central column 108, the overall density of the core 102 is dramatically reduced, while the flared ends 162 and 164 provide expanded support surfaces that are configured to increase contact surface areas of components, such as a skin and the base 110, respectively. Further, by reducing the width or diameter of the central column 108, less material is used to form the cells 108, thereby providing a lighter core 102 at a reduced material cost.

In at least one embodiment, the core 102 may include the cells 108 having flared ends 162 and 164, as shown in FIGS. 11 and 12, without a flexible base. As noted, using such cells 108 reduces density, weight, and cost of a core. The shape, symmetry or asymmetry, and size of the cells 108, including the flared ends 162 and 164, may be chosen to obtain a desired acoustic attenuation characteristic. For example, the flared ends 162 and 164 may be sized and shaped to provide a Helmholtz resonator, thereby rendering a septum unnecessary. Optionally, at least one of the cells 108 may include a septum.

Figure 13:
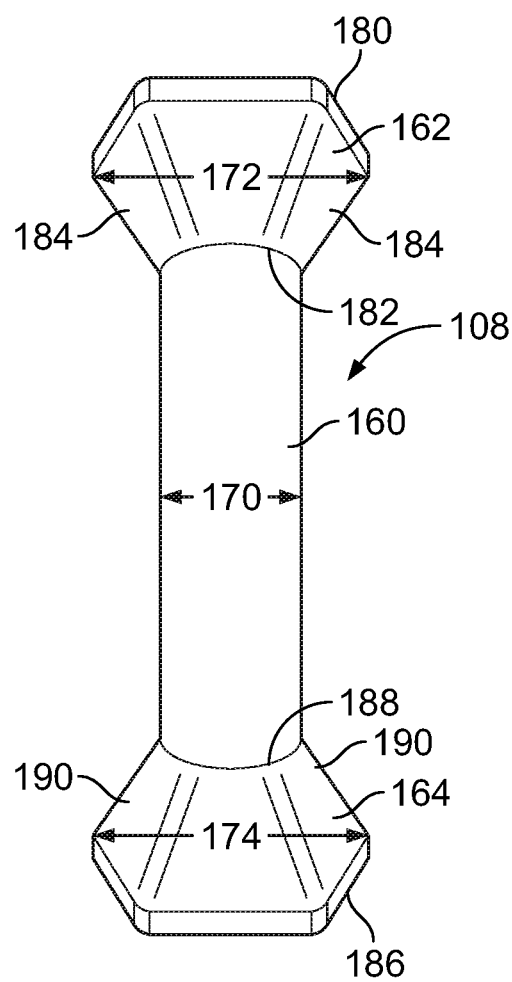
FIG. 13 illustrates a perspective front view of a cell, according to an embodiment of the present disclosure.

FIG. 13 illustrates a perspective front view of a cell 108, according to an embodiment of the present disclosure. The width 170 of the central column 108 is less than the respective widths 172 and 174 of the flared ends 162 and 164. The flared ends 162 and 164 may be mirror image structures. Optionally, the flared ends 162 and 164 may be sized and shaped differently than one another.

The flared end 162 includes outwardly flared support edges 180 that connect to an end 182 of the support column 160 through inwardly-directed walls 184 that angle towards the reduced width end 182. Similarly, the flared end 164 includes outwardly flared support edges 186 that connect to an end 188 of the support column 160 through inwardly-directed walls 190 that angle towards the reduced width end 188. The flared ends 162 and 164 may have a plurality of wall portions that connect to one another forming edges. Optionally, the flared ends 162 and 164 may include an arcuate smooth wall, such as a semispherical wall.

Figure 14:
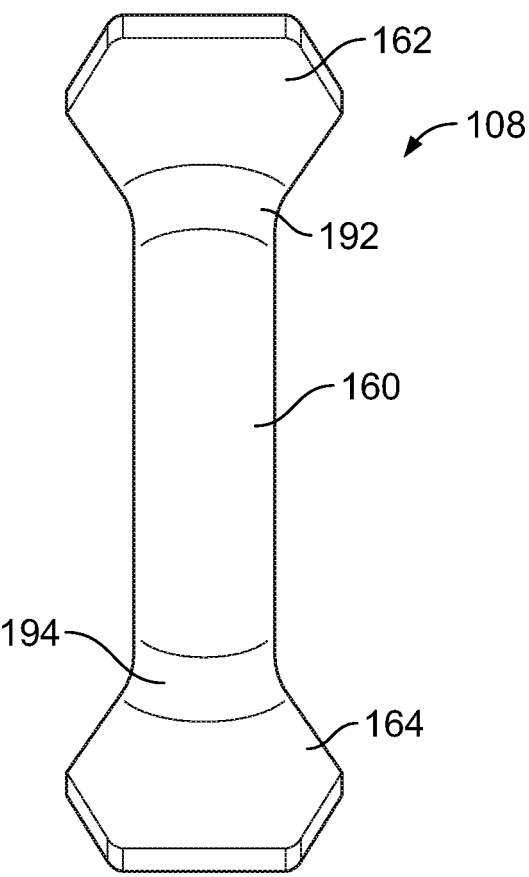
FIG. 14 illustrates a perspective front view of a cell, according to an embodiment of the present disclosure.

FIG. 14 illustrates a perspective front view of a cell 108, according to an embodiment of the present disclosure. The cell 108 is similar to that shown in FIG. 13, except that the flared ends 162 and 164 may connect to the support column 160 via smooth arcuate transitions 192 and 194. The smooth transitions 192 and 194 provide increased strength and resiliency to the cell 108.

Figure 15:
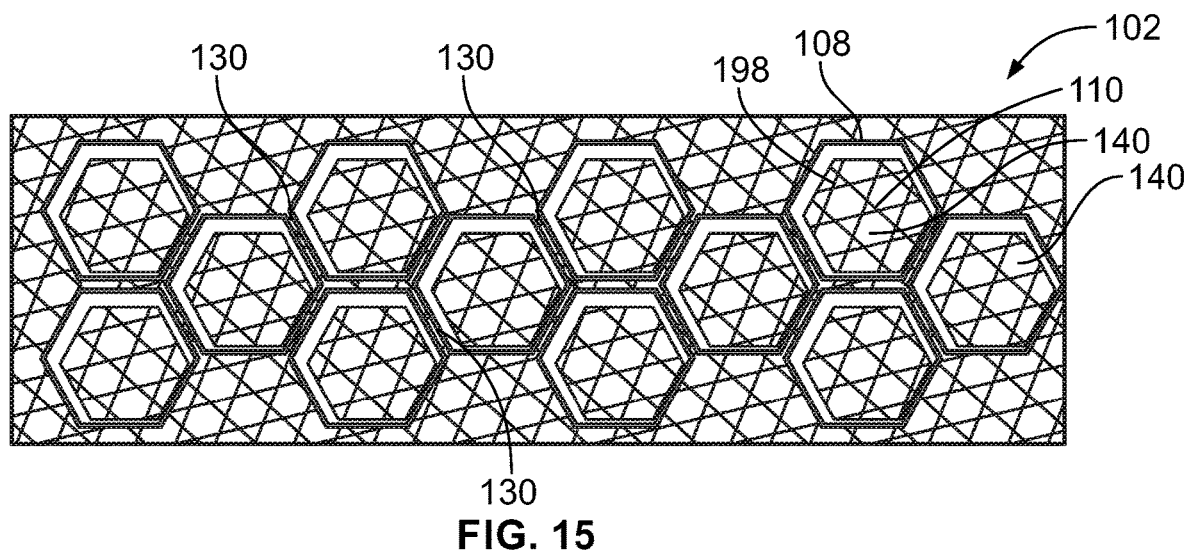
FIG. 15 illustrates a perspective top view of a core, according to an embodiment of the present disclosure.

FIG. 15 illustrates a perspective top view of a core 102, according to an embodiment of the present disclosure. As shown, the base 110 may be formed by a plurality of beams (as shown in FIGS. 9 and 10) which cooperate to form a series of regular, repeating six pointed star patterns 198. It has been found that the six pointed star patterns 198 provide increased component surface support (due to the increased intersections between the beams) while also providing increase flexibility due to the holes 140 between the beams.

Figure 16:
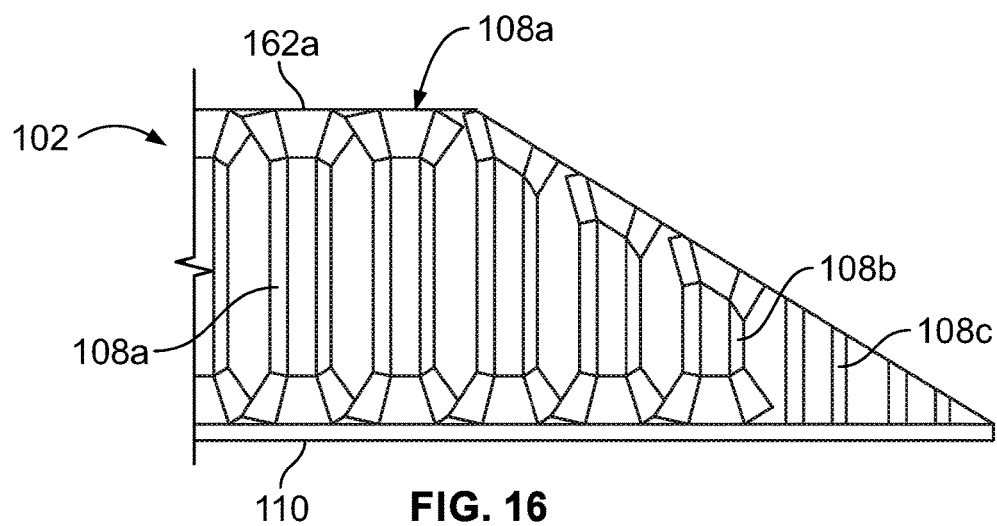
FIG. 16 illustrates a lateral view of a core, according to an embodiment of the present disclosure.

FIG. 16 illustrates a lateral view of a core 102, according to an embodiment of the present disclosure. As shown, the core 102 includes a plurality of cells 108, some of which differ in size and shape from one another. For example, the cells 108a are taller than the cells 108b and 108c. Further, the flared ends 162a of the cells 108a may include flat support surfaces, while the flared ends 108b of the cells 108b may include angled support surfaces. Further, the cells 108c may not include flared end. The cells 108a, 108b, and 108c shown in FIG. 16 are merely exemplary, and may be sized and shaped differently than shown. The cells 108a, 108b, and 108c may be formed having different sizes and shapes to form a core 102 having different shapes and sizes. In general, the cells of the core 102 may be of different heights, shapes, and sizes.

Figure 17:
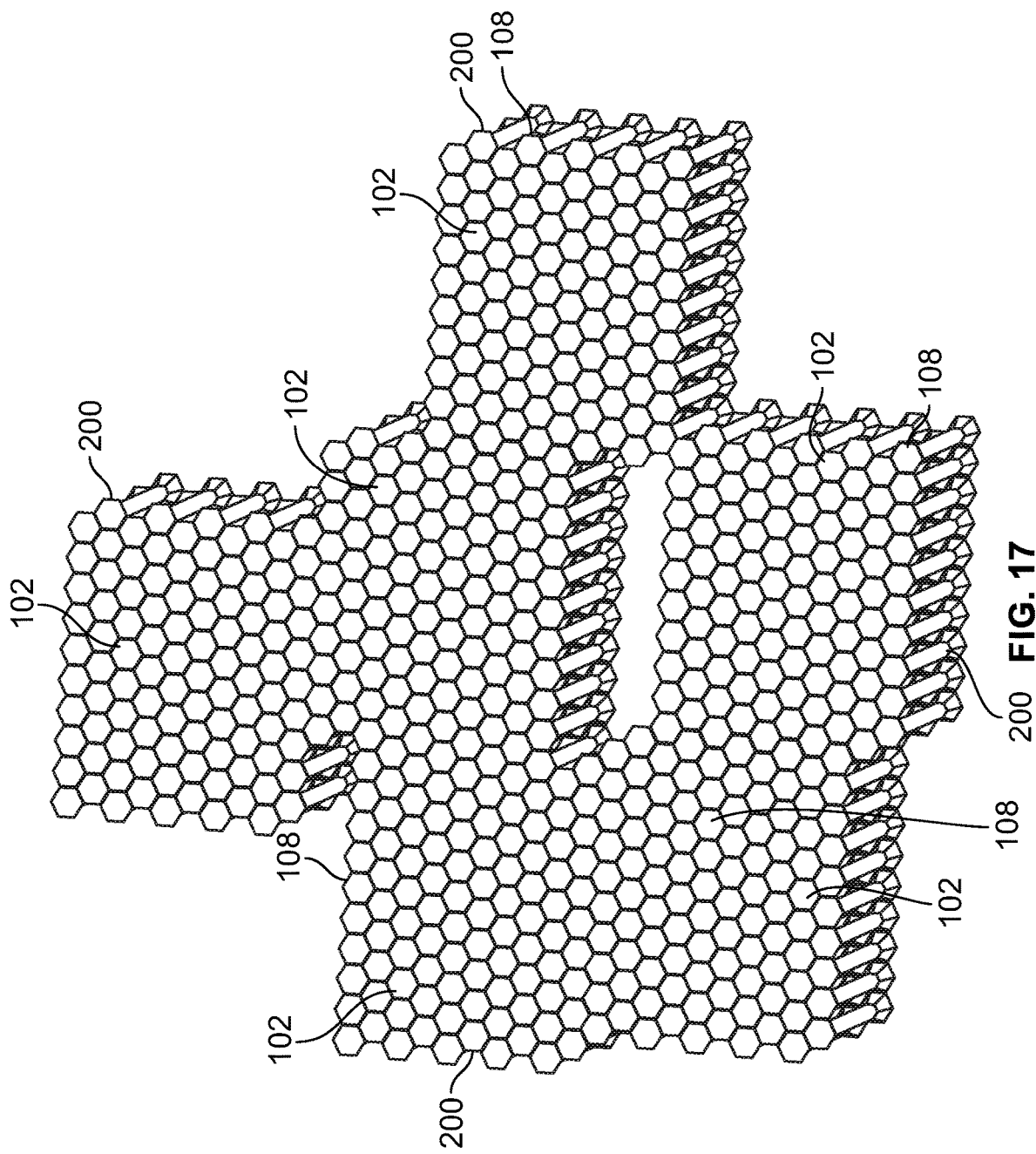
FIG. 17 illustrates a perspective view of a plurality of cores connected together, according to an embodiment of the present disclosure.

FIG. 17 illustrates a perspective view of a plurality of cores 102 connected together, according to an embodiment of the present disclosure. Outer peripheral edges 200 are defined by outer peripheral edges of cells 108 (such as at flared end portions) that interlock together. In this manner, multiple cores 102 may be modularly connected together through interlocking peripheral edges 200.

Figure 18:
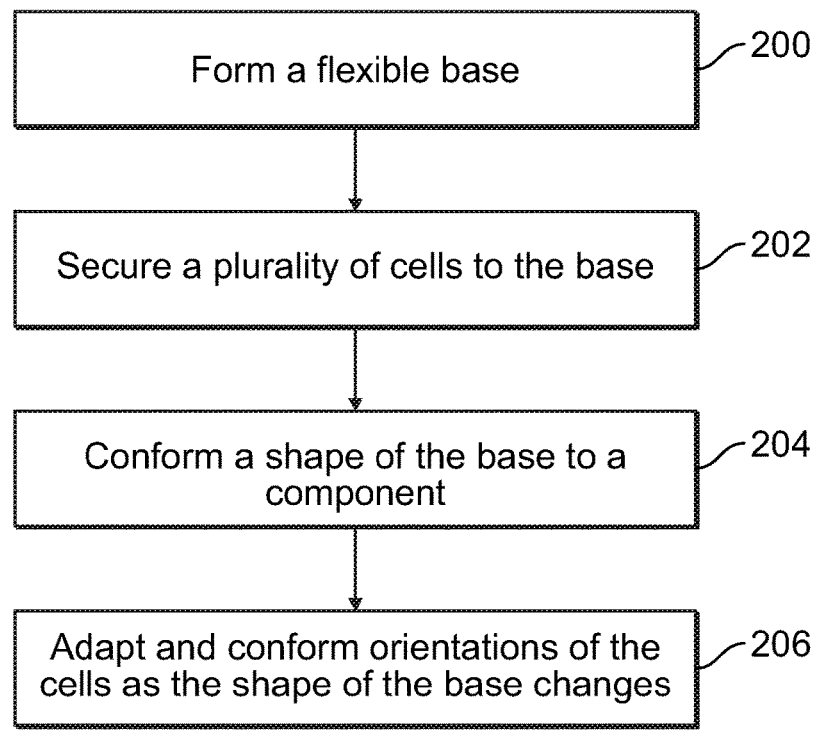
FIG. 18 illustrates a flow chart of a method of forming a core of a composite structure assembly, according to an embodiment of the present disclosure.

FIG. 18 illustrates a flow chart of a method of forming a core of a composite structure assembly, according to an embodiment of the present disclosure. At 200, a flexible base (such as the base 110 shown in FIG. 1) is formed. At 202, a plurality of cells (such as the cells 108 shown in FIG. 1) are secured to the base. At 204, the base is secured to a component (for example, a surface of a structure), such that a shape of the base conforms to the component, due to the flexibility of the base. In response to 204, orientations of the cells are adapted and conformed to the base, as the shape of the base changes to conform to the component at 206.

Figure 19:
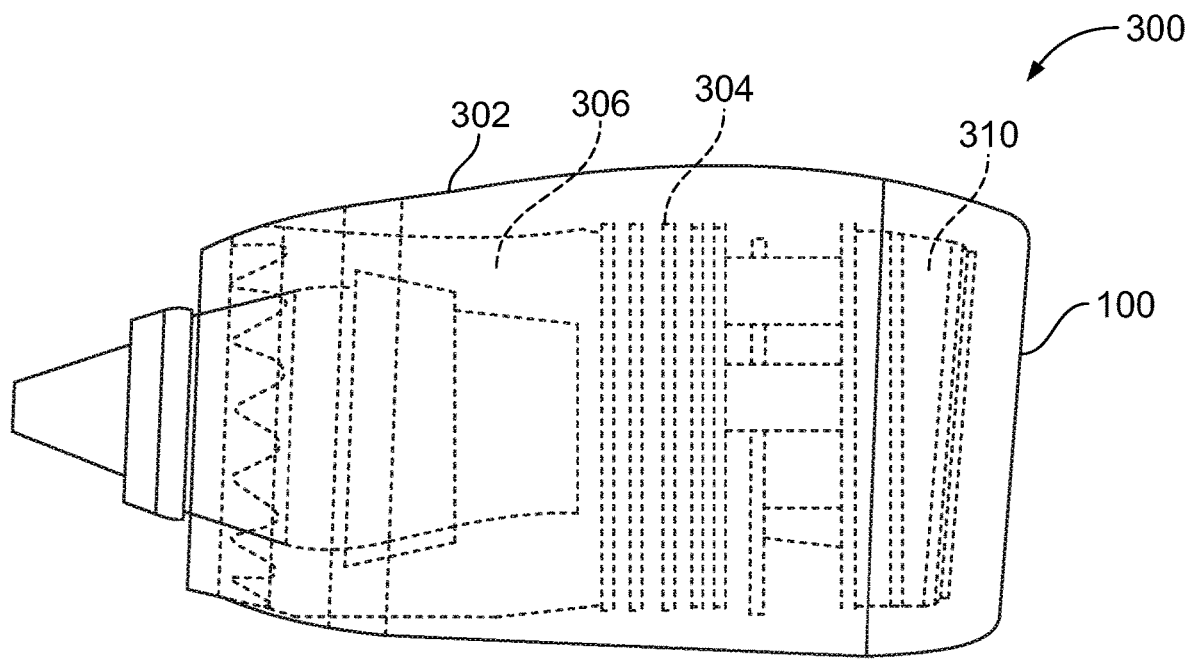
FIG. 19 illustrates an internal view of an aircraft engine, according to an embodiment of the present disclosure.

FIG. 19 illustrates an internal view of an aircraft engine 300, according to an embodiment of the present disclosure. The aircraft engine 300 includes a main housing 302 that retains a fan 304, an engine 306, and a composite structure assembly 100 (including an acoustic core), such as an acoustic inlet barrel, positioned proximate to an air intake inlet 310 of the aircraft engine 300. The composite structure assembly 100 may be formed as described above. Various other portions of the main housing 302 may be formed from composite structure assemblies, including acoustic cores, as described herein. Embodiments of the present disclosure may be used to form various composite components, such as acoustic inlet inner barrels, exhaust acoustic treatments, plugs, nozzles, thrust reversers, bypass ducts, nacelles, wing-to-body fairings, landing gear components, and the like.

Referring to FIGS. 1-19, embodiments of the present disclosure provide efficient systems and methods of forming a core of a composite structure assembly. Further, the core of a composite structure assembly is configured to conform to various shapes. Additionally, embodiments of the present disclosure provide systems and methods of forming a core of a composite structure assembly without the need for a support structure to shape the core.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A composite structure assembly, comprising:
a composite core including a flexible base and a plurality of cells extending from the flexible base, the composite core being conformable to different shapes, wherein the plurality of cells are configured to move in response to movement of the flexible base,
wherein the plurality of cells includes a main body defining a central cavity extending through and between opposite ends of the main body, and
wherein the plurality of cells are separated from one another by a plurality of gaps.

2. The composite structure assembly of claim 1, wherein each of the plurality of cells comprises:
a first end that directly connects to a support surface of the flexible base; and
a second end opposite the first end, wherein the second end is free.

3. The composite structure assembly of claim 1, further comprising one or both of a first skin coupled to the base, and a second skin coupled to the plurality of cells.

4. The composite structure assembly of claim 1, wherein at least one of the plurality of cells comprises a honeycomb structure.

5. The composite structure assembly of claim 1, wherein the flexible base comprises a plurality of holes.

6. The composite structure assembly of claim 1, wherein the flexible base comprises a plurality of linear row beams connected to a plurality of linear column beams, wherein a plurality of openings are formed between the plurality of linear row beams and the plurality of linear column beams.

7. The composite structure assembly of claim 6, further comprising a plurality of diagonal beams connected to the plurality of linear row beams and the plurality of linear column beams.

8. The composite structure assembly of claim 1, wherein the flexible base comprises a plurality of regular, repeating six pointed star patterns that define a plurality of openings.

9. The composite structure assembly of claim 1, wherein at least one of the plurality of cells comprises a central column connected to a first flared end and a second flared end that is opposite from the first flared end.

10. The composite structure assembly of claim 9, wherein a first width of the central column is less than each of a second width of the first flared end and a third width of the second flared end.

11. The composite structure assembly of claim 9, wherein each of the first flared end and the second flared end connects to the central column through a smooth transition.

12. The composite structure assembly of claim 1, wherein at least two of the plurality of cells differ in one or both of size and shape.

13. The composite structure assembly of claim 1, wherein the composite structure assembly is configured to interlock to another composite structure assembly via outer peripheral edges.

14. A composite structure assembly, comprising:
a composite core including a plurality of cells extending from a flexible base, wherein the plurality of cells includes a main body defining a central cavity extending through and between opposite ends of the main body, wherein at least one of the plurality of cells comprises a central column connected to a first flared end and a second flared end that is opposite from the first flared end,
wherein the plurality of cells are separated from one another by a plurality of gaps.

15. The composite structure assembly of claim 14, wherein a first width of the central column is less than each of a second width of the first flared end and a third width of the second flared end.

16. The composite structure assembly of claim 14, wherein each of the first flared end and the second flared end connects to the central column through a smooth transition.

17. A method of forming a composite structure assembly, the method comprising:
providing a composite core including a plurality of cells extending from a flexible base, wherein the plurality of cells includes a main body defining a central cavity extending through and between opposite ends of the main body, wherein the providing comprises separating the plurality of cells from one another by a plurality of gaps; and
conforming the composite core to different shapes, wherein the conforming comprises moving the plurality of cells in response to movement of the flexible base.

18. The method of claim 17, further comprising coupling one or both of: a first skin to the base, and a second skin to the plurality of cells.

19. The method of claim 17, further comprising forming a plurality of holes through the flexible base.

20. The method of claim 17, further comprising forming the base with a plurality of regular, repeating six pointed star patterns that define a plurality of openings.

21. The method of claim 17, further comprising forming at least one of the plurality of cells to have a central column connected to a first flared end and a second flared end that is opposite from the first flared end, wherein a first width of the central column is less than each of a second width of the first flared end and a third width of the second flared end, and wherein each of the first flared end and the second flared end connects to the central column through a smooth transition.

* * * * *